United States Patent [19]
Hattass et al.

[11] Patent Number: 5,048,889
[45] Date of Patent: Sep. 17, 1991

[54] MOUNTING UNIT FOR MOTOR VEHICLE SLIDING ROOFS

[75] Inventors: Rainer Hattass, Gründau; Dieter Federmann, Hanau, both of Fed. Rep. of Germany

[73] Assignee: Rockwell-Golde G.m.b.H., Fed. Rep. of Germany

[21] Appl. No.: 489,126

[22] Filed: Mar. 5, 1990

[30] Foreign Application Priority Data

Mar. 14, 1989 [DE] Fed. Rep. of Germany ....... 3908239

[51] Int. Cl.$^5$ .............................................. B60J 7/047
[52] U.S. Cl. .................................... 296/213; 296/216; 296/220; 296/223; 296/224
[58] Field of Search ............... 296/213, 216, 218, 220, 296/223, 224

[56] References Cited

U.S. PATENT DOCUMENTS 4,844,535  7/1989  Farmont ............................. 296/216

FOREIGN PATENT DOCUMENTS 0049983  4/1982  European Pat. Off. ............ 296/224
0249268  12/1987 European Pat. Off. ............ 296/216
0347958  12/1989 European Pat. Off. ............ 296/218
3211519  10/1983 Fed. Rep. of Germany ...... 296/223
260433   11/1926 United Kingdom ................ 296/216

*Primary Examiner*—Dennis H. Pedder

[57] ABSTRACT

A mounting unit for providing a complete sliding roof assembly to a motor vehicle roof having an opening therein. The mounting unit includes an assembly frame adapted to be seated on an external peripheral edge of the vehicle roof surrounding the opening and providing a guide rail at each side of the opening, at least one sliding element in each of the guide rails, a cover for closing the roof opening, pivot means mounting a leading edge of the cover for pivoting movement, and a pivotally mounted opening lever in each guide rail and connected to the cover for supporting the cover when it is raised. Swivel bearings are provided for connecting one side of the frame assembly to the vehicle roof, and a locking mechanism is also provided. The frame assembly, guide rails, cover and opening levers are mountable to the vehicle roof from above as a unit, and the assembly frame may be pivoted about the swivel bearings to pivot the mounting unit away from the roof opening.

4 Claims, 4 Drawing Sheets

MOUNTING UNIT FOR MOTOR VEHICLE SLIDING ROOFS

FIELD OF THE INVENTION

The invention relates to a mounting unit for a motor vehicle sliding roof, particularly for rigid sliding roofs.

DESCRIPTION OF THE PRIOR ART

A mounting unit for sliding roofs, particularly rigid sliding roofs, is known from DE-OS 34 19 901, in which there are two reinforcement plates, which engage below edges of the roof opening directed at right angles to the main travel direction and which in part form a channel-like support for the cover lowered into the closed position. The two guide rails which have to be fitted on the longitudinal edges of the roof opening have to be fitted independently and separately from the reinforcement plates on the vehicle roof. The reinforcement plates can be fitted at the time of the manufacture of the vehicle body. Together with parts of the cover support, or parts of the actuating mechanism for the cover, as well as the actual cover, the guide rails can be fitted into the prepared vehicle body with a mechanical mounting aid, on which they can be temporarily fixed in their precise fitting position by means of clamps or the like. However, this known mounting unit suffers from the disadvantage that a number of preparatory operations have to be carried out on it until the sliding roof installed in the body and ready to operate is available. For example, the mechanical mounting aids have to be removed again and the height of the guide rails must be adjusted, so as to ensure the desired cover height position.

In a known ventilating means (DE-AS 1 050 676), a ventilating cover is fixed in easily detachable manner in an inner frame by a resilient locking mechanism, so that after releasing the cover the latter can be catapulted rearwards, in order to free the roof opening as an emergency exit. Quite apart from the fact that a cover shot away in uncontrolled manner, i.e. violently separated from the vehicle body, constitutes a considerable injury risk for other vehicles and their occupants, the head movement space is considerably restricted by the sliding roof frame used for receiving the cover and which projects from above into the vehicle interior.

The present invention is therefore directed at the problem of providing a mounting unit, which can be completely prefabricated in ready-to-operate form and. can be so mounted on the roof opening with simple means that there is no restriction to the head movement space in the vehicle interior. In addition, the mounting unit must permit the rapid release of the roof opening as an emergency exit.

SUMMARY OF THE INVENTION

According to the present invention, there is provided a mounting unit for a motor vehicle sliding roof, particularly for a rigid sliding roof, with a cover closing a roof opening fitted in the vehicle roof and which with its trailing edge can be raised over the fixed roof surface into a ventilation position and, for the partial freeing of the roof opening, is longitudinally displaceable with its raised trailing edge over the rear fixed roof surface by means of sliding elements engaging in guide rails fitted on both lateral edges of the roof opening and in the vicinity of its leading edge the cover can be pivoted about an axis at right angles to the direction of travel on front sliding elements and in the vicinity of its trailing edge is supported by means of roof-side, pivotably mounted opening levers, the guide rails, opening levers and cover being mounted on an assembly frame surrounding the roof opening in uninterrupted manner and being mountable from above on the fixed roof surface, with one side of said frame being connected via swivel bearings to the vehicle roof and being lockable to the vehicle roof on the opposite side.

According to the basic idea of the invention the cover and all its movement-controlling functional parts are firmly interconnected in their final assembly position with an assembly frame which, following the complete prefabrication of the mounting unit, only has to be fitted at specific points of the vehicle roof, namely at its swivel bearings. Following unlocking, the complete mounting unit can be pivoted by means of the swivel bearings upwards and then towards the swivel bearing side until the mounting unit firmly rests on the vehicle roof as a result of its weight. Thus, virtually the entire roof opening is available as an emergency exit. The mounting unit can be completely prefabricated prior to its fitting to the vehicle, including the necessary painting and adjustment operations, so that the operationally tested mounting unit can either be supplied directly to the production line of a vehicle manufacturer for immediate mounting in the prepared body, or can be supplied to an assembly point for subsequent fitting in the already manufactured vehicle. In both cases the mounting unit can be installed in a very simple way, because it is merely necessary to place the mounting unit in accurate fitting manner on the vehicle roof provided with the roof opening and to fix it to the roof.

The assembly frame can have an all-round, upwardly open water channel, which underpins the edge of the cover and to which water check drains are connected terminating above the fixed roof surface. With this arrangement, there is no need to hermetically seal the cover with respect to the mounting frame by the marginal gap seal normally used on its circumference. Thus, any water entering via the marginal gap or clearance passes into the water channel underpinning the cover edge and is led away from there onto the fixed roof surface.

The assembly frame can be connected to a cover strip passing round its outer circumference and which, considered in cross-section, slopes outwards from top to the bottom, terminates with a clearance above the fixed roof surface and forms with the outer circumferential wall of the water channel a cavity open to the outside through the clearance and in which the water drains terminate. This form of cover strip not only ensures a continuous transition between the fixed roof surface and the outer cover surface, but also conceals the water drains connected to the water channel and in the case of a corresponding design can also assume the function of a decorative strip.

The assembly frame can be provided with an all-round seal on the bearing surface of the mounting unit facing the fixed roof surface. This ensures the necessary sealing between the mounting frame and the fixed roof surface and as a result of a corresponding design of the seal it is also possible to compensate different curvatures or curvature divergences of the vehicle roof. Compensation is brought about by relative elastic deformation of the seal. Thus, the mounting unit can consequently be used without any modification for different vehicles, particularly if the driving cabs of lorries are involved, in which the roofs are substantially planar.

Preferably the swivel bearings are provided on the front side of the assembly frame in the direction of travel. The locking means are then provided on the rear side of the mounting frame. In this construction, following the release of the locking mechanism, the mounting unit is pivoted upwards and forwards.

The swivel bearings can comprise outwardly directed bearing projections fixed to the assembly frame and which are pivotably connected by means of bearing pins to bearing blocks to be fixed to the vehicle roof.

At least one locking mechanism can be provided on the side of the assembly frame facing the swivel bearings which is formed from lever elements pivotably movable on the underside of the assembly frame and a retaining element lockable therewith and to be fixed to the adjacent roof opening edge. This form of locking mechanism is appropriately arranged in homologously coinciding construction on the rear of the mounting frame in the vicinity of its side parts and can be easily unlocked as a result of its construction. The lever element can comprise a cover plate articulated by one end to the assembly frame and a two-armed angle lever, which is articulated to the other end of the cover plate and in the locking position engages with its shorter arm on a locking bolt fixed to the retaining element in a top dead centre position present with respect to the imaginary connecting line between the articulation points, whilst its longer arm is directed substantially parallel to the vehicle roof. This particularly reliable construction of the locking mechanism makes impossible an unintentional unlocking through the top dead centre position.

The guide rails can be fixed in a one-piece, U-shaped arrangement with respect to the direction of travel, both laterally and rearwardly to the assembly frame. Flexible drive cables can be displaceably guided in guide channels of the guide rails and are rigid in compression, which cables engage with a manually or motor-operated driving pinion and which are in driving connection with rear sliding elements, the drive mechanism of the driving pinion being fitted to the rear of the assembly frame. An operating lever can be articulated to each of the rear sliding elements, which lever is pivotably connected to the opening lever, which is on the one hand articulated to the cover and on the other to the assembly frame, the operating lever acting between the two articulation points in the vicinity of the cover-side articulation point on opening the lever.

This arrangement forms a device for the movement control of the cover, which can be easily manufactured as a result of the one-piece construction of the guide rails and can be easily fitted to the assembly frame, force transmission or transfer taking place by the proven drive cables provided for this purpose. Through the connection of the opening lever to associated operating levers of rear sliding elements, a particularly favourable force transfer is obtained, the opening movement and cover displacement movement taking place simultaneously and speedily.

Each opening lever can be arranged in the direction of travel with the cover closed so as to slope upwards from rear to front and its lower ends are pivotably mounted in downwardly directed outward bulges of the assembly frame. The outward bulges on the mounting frame necessary for the inclined position of the opening lever do not reduce the head freedom within the vehicle, because the mounting frame is placed from above on the fixed vehicle roof and no parts thereof project into the vehicle interior.

The assembly frame can be provided laterally and rearwardly with an upwardly open reception depression corresponding to the U-shaped arrangement of the guide rails and in which are inserted and fixed the guide rails and which is divided off from the water channel by a partition. Thus, a reception depression for the guide rails can be advantageously integrated into the mounting frame. The walls of the water channel, the cover strip and the walls of the reception depression can form an assembly frame moulded in one piece. The main elements of the mounting frame are thus moulded in one piece from a suitable material, e.g. by injection moulding from a suitable fibre-glass reinforced plastics.

BRIEF DESCRIPTION OF THE DRAWINGS

For a better understanding of the invention and to show how the same may be carried into effect, reference will now be made, by way of example, to the accompanying drawings, in which.

Figure 2:
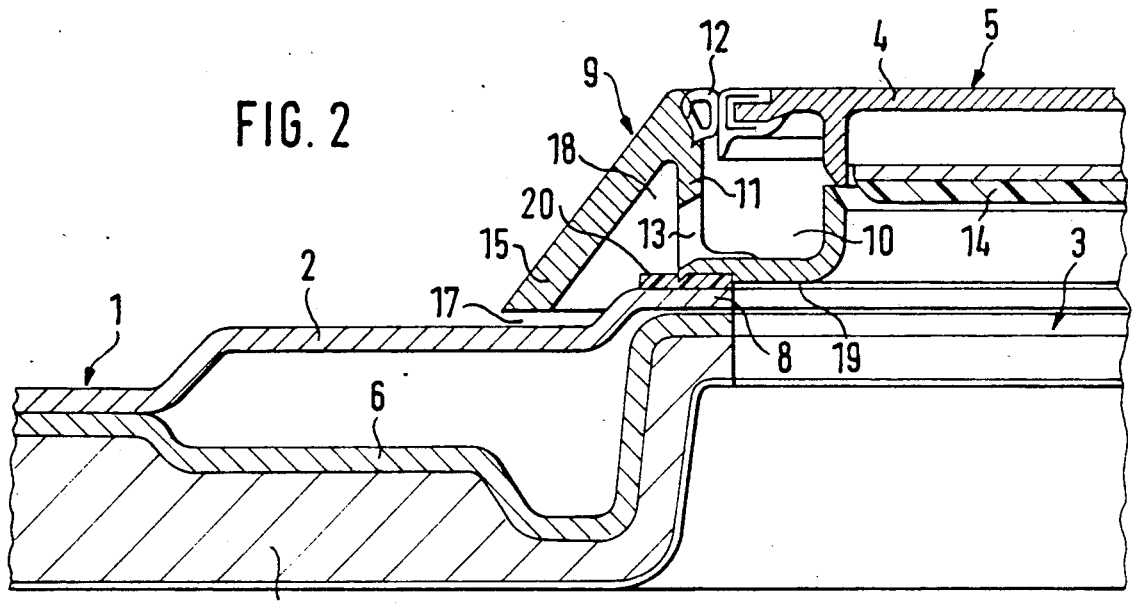
FIG. 2 is a section along line II—II of FIG. 1.
Figure 7:
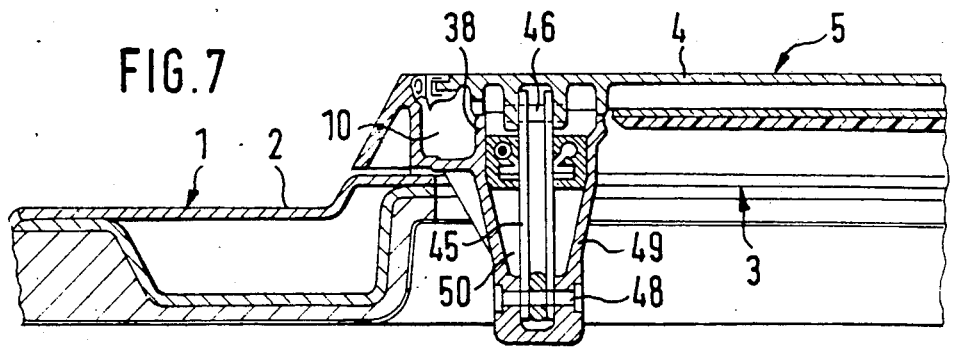
FIG. 7 is a section along line VII—VII of FIG. 1.

All the sectional representations according to FIGS. 2 and 7 are broken away and in part shown in different scales. The representation is partly diagrammatic in the area not essential to invention.

DESCRIPTION OF THE PREFERRED EMBODIMENT

Figure 1:
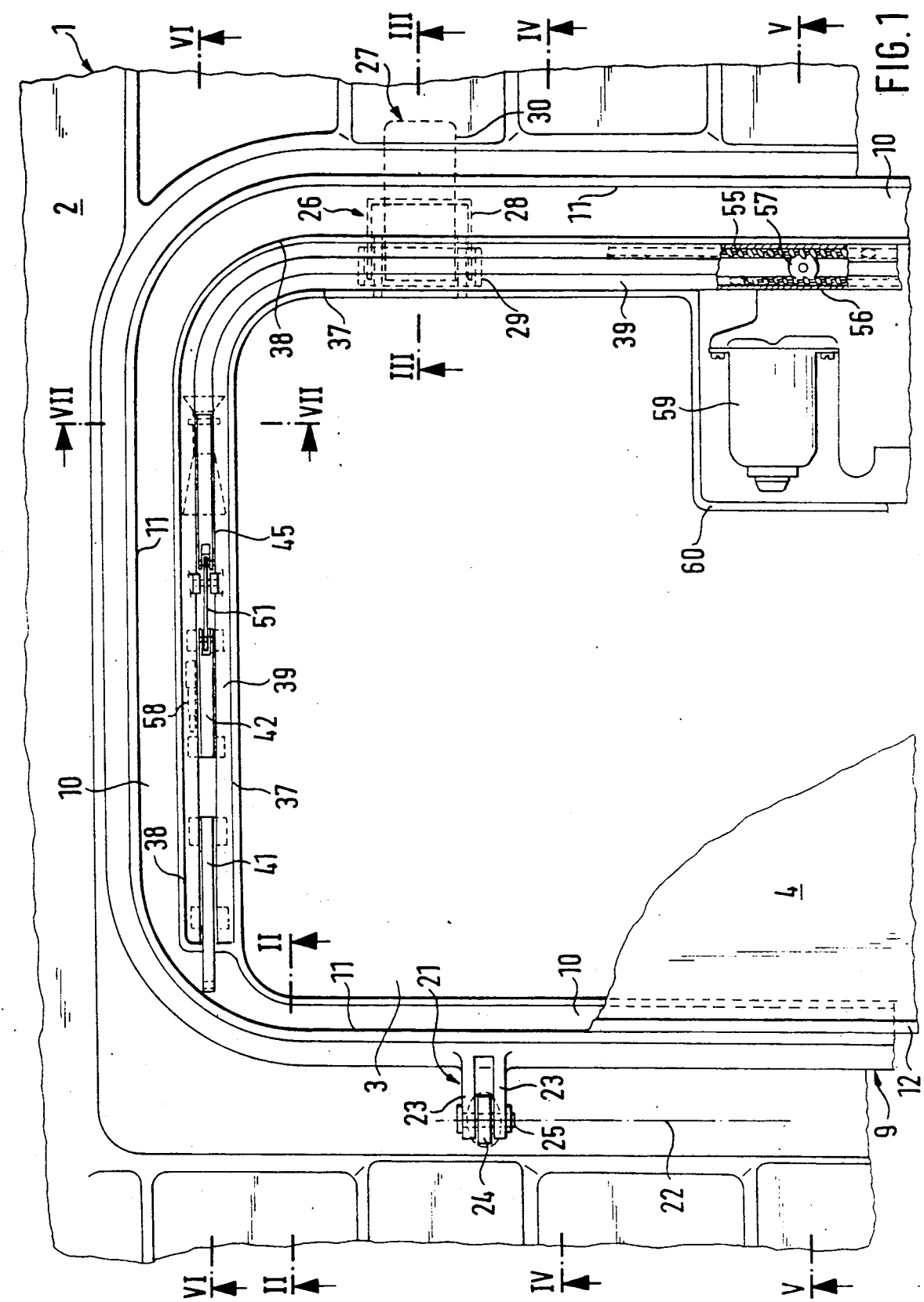
FIG. 1 is a broken away plan view of a vehicle roof with the fitted mounting unit.

The vehicle roof 1 of the embodiment shown in the drawings is the roof of the cab of a lorry, as is apparent from the reinforcing seam structure of the fixed roof surface 2 revealed in FIG. 1. However, the mounting unit is usable in the same way for cars, such as e.g. cross-country vehicles. Within vehicle roof 1 is provided a roof opening 3, which can be closed by the cover of the mounting unit 5. Below the fixed roof surface 2 is provided a roof reinforcement 6, which together with the fixed roof surface 2 forms a hollow profile surrounding the roof opening 3 and reinforcing the roof opening edge, cf. e.g. FIG. 2. A moulded canopy 7 is fixed from below to the vehicle roof 1. On all sides, the roof opening 3 is bounded by edges of the fixed roof surface 2, the roof reinforcement 6 and the canopy 7. An upwardly projecting flange edge 8 passing round in one plane and on which is mounted the mounting unit 5 in a manner to be described hereinafter is formed directly on the roof opening 3 from the fixed roof surface 2. The mounting unit 5 has an assembly frame 9, which is inherently rigid as a result of its profiling to be described hereinafter and which surrounds in uninterrupted manner the roof opening 3. The stability of the assembly frame 9 basically results from an all-round, upwardly open water channel 10, which is outwardly bounded by a circumferential wall 11 and which underpins the edge of the cover 4. To the edge of cover 4 is fixed in conventional manner an all-round marginal gap seal 12, which engages tightly on the circumferential wall 11 when cover 4 is closed. Any water which, despite the seal 12, penetrates through the gap passes into the water channel 10 and flows away out of the latter via water drains 13, which, in accordance with FIG. 2, are constructed as openings in the circumferential wall 11 and terminate above the fixed roof surface 2. Several water drains 13 can be distributed over the circumference of the assembly frame 9. In the represented embodiment the cover 4 is an integrally plastics injection moulded body and its underside is lined by a cover canopy 14.

The outer circumference of the assembly frame 9 is provided with an all-round cover strip 15, which, considered cross-sectionally, slopes from top to bottom and outwards. The outer face of the cover strip 15 forms a continuous transition between the fixed roof surface 2 and the upper surface of the cover 4. The cover strip 14 terminates with a clearance 17 above the fixed roof surface 2 and, together with the circumferential wall 11 constituting the outer wall of the water channel 10, forms an outwardly open cavity 18 through the clearance 17. Water passing out from the water channel 10 through the water drains passes into the cavity 18 and therefore onto the fixed roof surface 2, where it can flow outwards through clearance 17. The bearing surface 19 of the assembly frame 9 facing the fixed roof surface 2 is provided with an all-round seal 20, which is fixed by embedding and/or bonding to the bearing surface 19. If the assembly frame 9 is placed on the vehicle roof 1 in a centered position with respect to the roof opening 3, then the seal 20 engages on the flange edge 8 and, after fixing the assembly frame 9 to the vehicle roof 1, seals the frame 9 with respect to the fixed roof surface 2. In the case of corresponding dimensioning and/or suitable material selection, the seal 20 permits a tight connection of the assembly frame 9 to the vehicle roof 1, even in the case of curvature divergences and imprecisions. Instead of being fixed to the assembly frame 9, the seal 20 can obviously be fixed with the same effect to the outer face of the flange edge 8, e.g. by bonding or adhesion.

Figure 3:
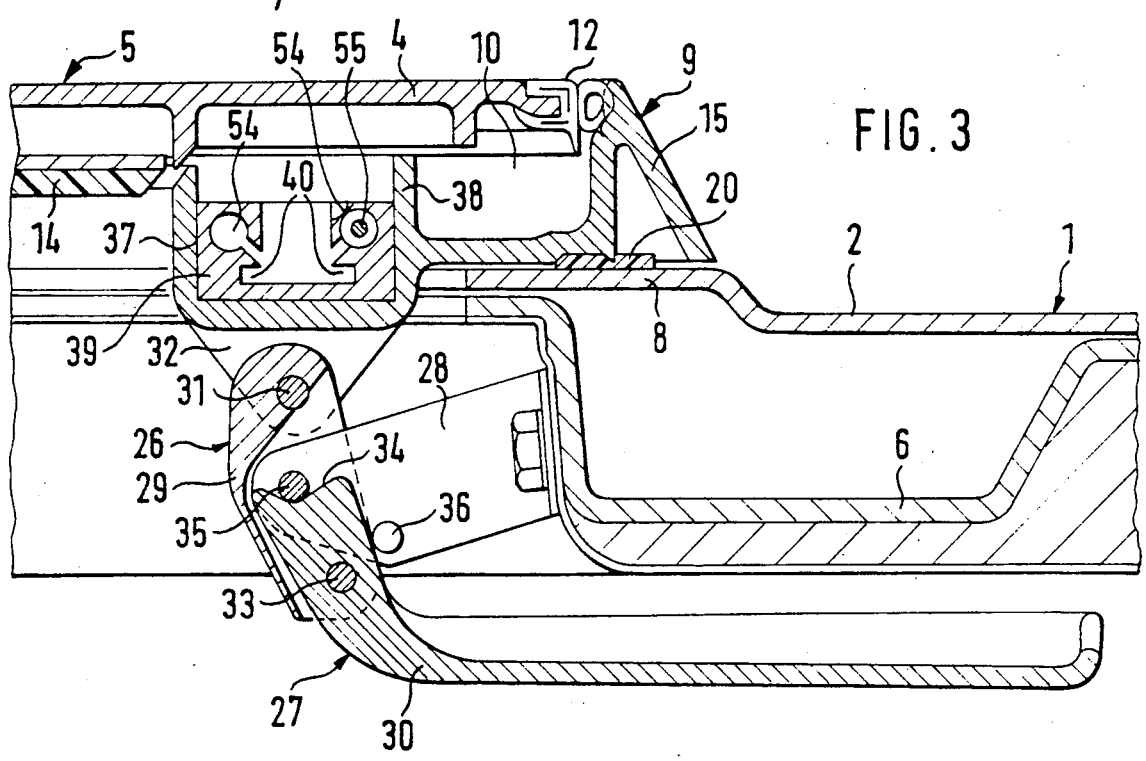
FIG. 3 is a section along line III—III of FIG. 1.
Figure 4:
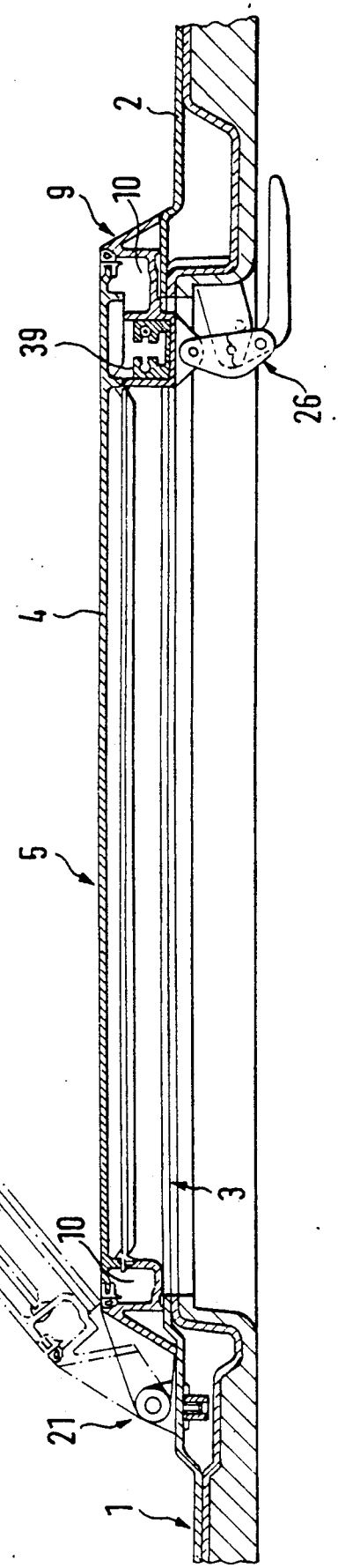
FIG. 4 is a section along line IV—IV of FIG. 1.
Figure 4:
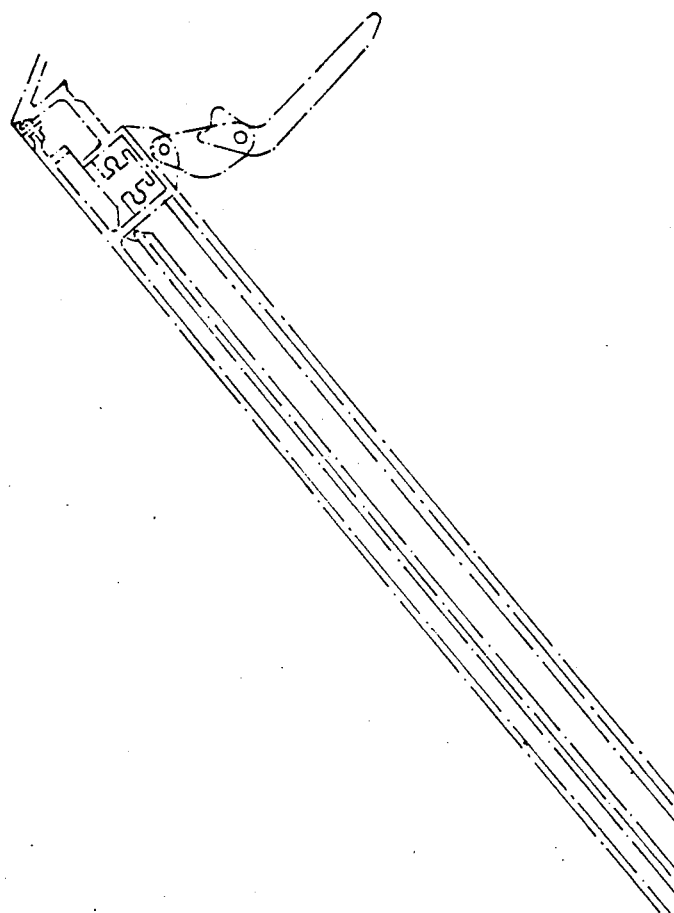
Figure 5:
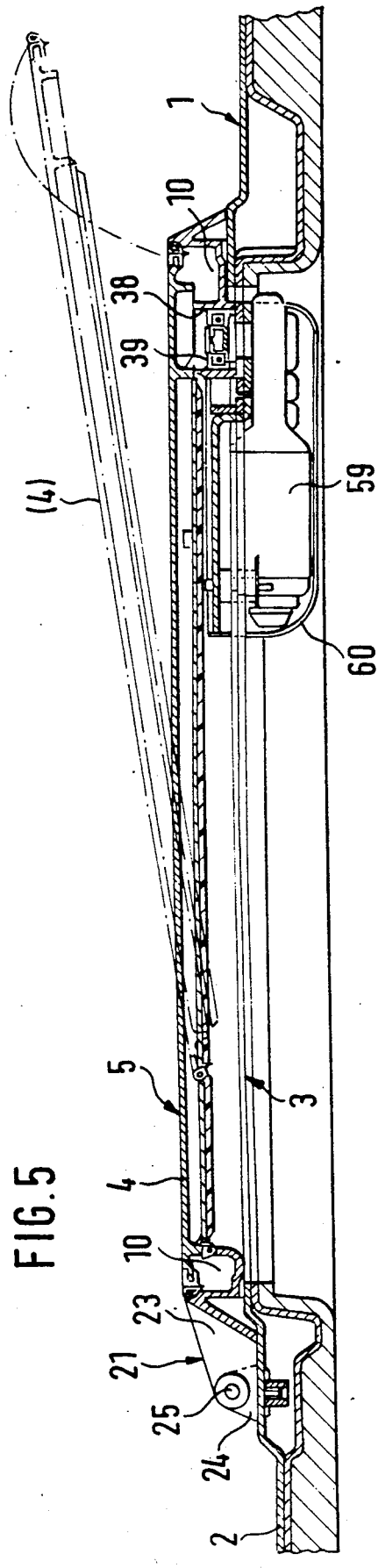
FIG. 5 is a section along line V—V of FIG. 1.

For the firm connection of the assembly frame 9 to the vehicle roof 1, two swivel bearings 21 are fitted on the front side of the assembly frame, whereof FIGS. 1, 4 and 5 only show the bearing located on the right-hand side of the vehicle (considered in the direction of travel). The swivel bearings form a swivel axis 22, indicated by the dot-dash line in FIG. 1, about which, after releasing the locking mechanism to be described, the complete mounting unit 5 can be swivelled out of its mounting and locking position shown in FIGS. 1 to 3 and 5 to 7 forwards in the travel direction until it engages on the front fixed roof surface 2. The dot-dash lines in FIG. 4 indicate an intermediate position of mounting unit 5 during its forward swivelling. It is clear that following the swivelling of the mounting unit, the complete size of the roof opening 3 is freed, so that an emergency escape from the driving cab can easily take place without being impeded by parts of the sliding roof construction.

The swivel bearings 21 are on the one hand formed by fork-like bearing projections 23 and on the other by bearing blocks 24, which are pivotably interconnected by means of bearing pins 25. The bearing projections 23 are fixed to the cover strip 15 of the assembly frame 9, whilst the bearing blocks 24 are detachably fixed to the fixed roof surface 2 of the vehicle roof 1 (FIG. 5).

On the opposite side of the assembly frame 9 to the swivel bearings 21 are also homologously arranged two locking mechanisms 26, whereof only that located on the right-hand vehicle side is visible in FIG. 1. Reference is made to FIG. 3 for the further explanation of the locking mechanism 26. The locking mechanism 26 comprises a lever element 27 pivotably fitted to the underside of frame 9 and a retaining element 28 lockable therewith and to be fixed to the adjacent roof opening edge of the roof 1. The lever element 27 comprises a cover plate 29 and a two-armed angle lever 30. The cover plate 29 is constructed in fork-like manner, cf. FIG. 1, with one end articulated by means of a swivel bolt 31 to a bearing block 32 of the assembly frame 9 and its other end is connected in articulated manner by means of a further swivel bolt 33 to the angle lever 30. The shorter arm of the angle lever 30 is provided at its end with a concavely shaped locking surface 34, which, in the locking position shown in FIG. 3, engages on a locking bolt 35 fixed to the retaining element 28. The locking bolt 35 is located outside an imaginary connecting line between the swivel bolts 31 and 33, so that the indicated locking position is ensured by a top dead center position. The shorter arm of the angle lever 30 engages on a stop 36 fixed to the retaining element 28. The longer arm of the angle lever 30 is directed in the locking position roughly parallel to the vehicle roof 1. If the locking mechanism 26 is to be operated for removing the locking action, then the angle lever 30 is pivoted downwards and its shorter arm is inwardly displaced with respect to the adjacent roof opening edge, whilst being supported on the stop 36. The swivel bolt 33 is correspondingly displaced in the opposite direction, until the locking bolt 35, which has remained fixed, is located on the other side of the imaginary connecting line between swivel bolts 31 and 33. By further pivoting of lever element 27, the engagement between the locking bolt 35 and the locking surface 34 is removed, so that the locking action is terminated and the mounting unit 5, as described, can be swivelled about the swivel axis 22 of the swivel bearing 21. Following unlocking the retaining elements 28, which also have a fork-like construction (FIG. 1), remain on the vehicle roof 1. The described arrangement can be constructed in such a way that the lever element 27 must be operated with a certain amount of force in order to remove the locking effect. This prevents unintentional unlocking actions. In the case of locking, the locking surface 34 engages on the locking bolt 35, so that the pivoting under force of the lever element 27 leads to the locking position shown in FIG. 3. During the locking process the assembly frame 9 is pressed firmly onto the flange edge 8 of the fixed roof surface 2, accompanied by the compression of seal 20.

As can be particularly clearly gathered from FIGS. 1, 3 and 4, the assembly frame 9 is provided at the side and rear with an upwardly open reception depression 37, which is divided from the water channel 10 by a through partition 38. Within the reception depression 37 is fixed a guide rail 39 inserted from above and it is constructed in one piece in a laterally and rearwardly continuous manner as a U-shaped member (FIG. 1).

The displaceable and openable fitting of cover 4 to assembly frame 9 will now be described. The guide rail 39 has opposite, undercut guideways 40 (FIG. 3) for the engagement of the front and rear sliding elements 41, 42. On each side is provided a front sliding element and a rear sliding element. The two front sliding elements 41 project over the water channel 10 and are in each case pivotably connected by means of a journal 43 to a bearing projection 44 of cover 4, cf. FIG. 6. The journals 43 on both cover sides form in the vicinity of the leading edge of cover 4 an axis running at right angles to the direction of travel, which permits the pivoting movement of cover 4 with respect to the assembly frame 9.

Figure 6:
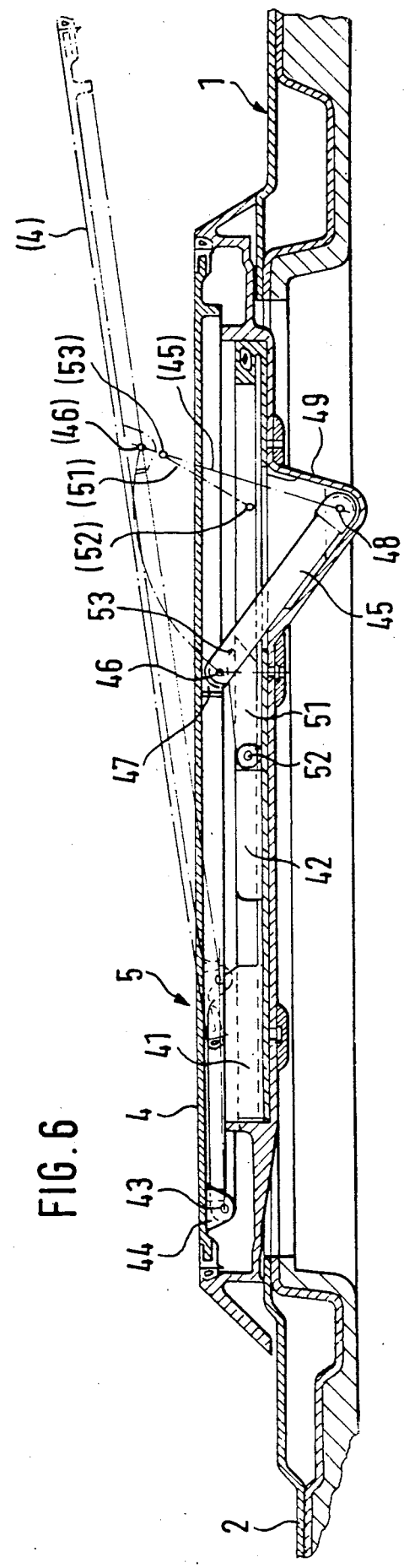
FIG. 6 is a section along line VI—VI of FIG. 1.

In the vicinity of its trailing edge the cover 4 is supported on either side, on the roof-side by pivotably mounted opening levers 45. The opening levers 45 are in each case on the one hand articulated by means of a swivel bolt 46 to the cover 4 and on the other by means of a swivel bolt 48 to the assembly frame 9. The swivel bolts 48 are located in a downwardly directed outward bulge 49 of the assembly frame 9, into whose cavity 50 the opening levers 45 extend, constructed as double levers (FIG. 7). As shown in FIG. 6, the opening levers 45 slope upwards from the rear to the front in the direction of travel, when the cover 4 is in the closed position.

A rearwardly directed operating lever 51 is articulated to each of the rear sliding elements 42 by means of a bearing pin 52. Operating lever 51 is pivotably connected by its rear end to the opening lever 45, via a further bearing pin 53. Bearing pin 53 is located between the two swivel bolts 48, 46 and in the vicinity of the latter.

As a result of the arrangement in FIG. 6 a displacement of the rear sliding element 42 to the right leads to a corresponding displacement of the operating lever 51, which brings about a clockwise pivoting of the opening lever 45, accompanied by a counterclockwise pivoting. The swivel bolt 46 moves on the swivel path indicated by dot-dash lines until the opening lever 45 is at the end of its swivel path bringing about the opening movement of the cover and whilst simultaneously displacing the latter, where it reaches a stop position indicated in FIG. 6 by the dot-dash line 45. In this stop position the operating lever 51 assumes the position indicated by the dot-dash line 51. FIG. 6 shows the corresponding positions of swivel bolt 46, bearing pin 52 and bearing pin 53, in each case indicated by the bracketed numerals.

During the simultaneously taking place of the superimposed displacement and opening movements, the trailing edge of the cover 4 follows the movement path indicated by dot-dash lines in FIG. 5. The arrangement is obviously such that the displacement and opening movements can be ended in each phase, so that random intermediate positions of the cover are made possible. A front ventilation gap is formed between the leading edge of the cover and the front part of the assembly frame 9 opening and rearward displacement of the cover.

In the illustrated embodiment, the cover 4 is driven by a long known sliding roof drive system. Flexible drive cables 55 or 56, (FIGS. 1 and 3) are displaceably guided rigid in compression in facing guide channels 54 of guide rail 39. At the rear side of the assembly frame 9, both drive cables 55, 56 are in non-positive engagement with a driving pinion 57 mounted in rotary manner there and on rotation of the same are reciprocally displaced in rack-like manner in their guide channels 54. By means of a dog 58 (FIG. 1) the drive cable 55 is non-positively connected to the rear sliding element 42 located on the right-hand side in the direction of travel. Correspondingly, on the not shown (FIG. 1) left-hand side, the drive cable 56 is non-positively connected to the other rear sliding element. Thus, as a function of the rotation direction of driving pinion 57, the two rear sliding elements 42 perform synchronous forward sliding movements in the travel direction or rearward sliding movements in the opposite direction.

In each case, the rear sliding elements 42 move with them the articulated drive lever 51 and opening lever 45 and consequently the cover 4.

In the illustrated embodiment the driving rotation of driving pinion 57 is brought about by an electric motor 59, which is fixed to the assembly frame 9 and is housed in an assembly frame casing 60 surrounding the same, as can be gathered from FIGS. 1 and 5. It is obviously also possible in known manner to provide a hand crank for the rotary drive of the driving piston 57.

All the drive elements for the cover 4 are fixed to the assembly frame 9, so that they can be pivoted together with the latter when it is unlocked. This arrangement also permits the complete assembly, adjustment and operational testing of the mounting unit 5 prior to its fitting to the vehicle roof 1.

In the illustrated embodiment, the walls of the water channel 10, the cover strip 15, the bearing projections 23 located thereon and the walls of the reception depression 37 are moulded in one piece from a suitable material, e.g. are injection moulded from a fibre-glass reinforced plastics and together form the assembly frame 9 which, as a result of its profiling obtained by the indicated elements, is very stable and torsionally stiff. It is also possible to mould in one piece bulges 49 and the casing 60.

We claim:

1. A mounting unit for providing a sliding roof to a motor vehicle roof having an opening fitted therein, comprising:

an assembly frame adapted to be seated on an external peripheral edge of said vehicle roof surrounding said opening and providing a guide rail at each lateral side of said roof opening, said assembly frame includes an upwardly open water channel and a cover strip around an outer circumference of said assembly frame, said cover strip slopes outward from top to bottom, terminates with a clearance above the roof surface, and forms with an outer wall of the water channel a cavity open to the outside through the clearance;

at least one sliding element in each of said guide rails;

a plurality of water drains through said outer wall of said water channel and terminating in said cavity;

a cover for closing said roof opening;

pivot means mounting a leading edge of said cover to a sliding element in each of said guide rails for pivoting movement of said cover about an axis at a right angle to a direction of travel of said sliding elements;

a pivotally mounted opening lever in each of said guide rails and connected to said cover for supporting a trailing edge of said cover when said trailing edge of said cover is raised to pivot said cover about said pivot means;

swivel bearings for connecting one side of said frame assembly to said vehicle roof; and means for locking a side of said frame assembly opposite to said one side to said vehicle roof, whereby said frame assembly, guide rails, cover and opening levers are mountable to the vehicle roof from above as a unit, said cover may be pivoted about said pivot means to selectively open and close said vehicle roof opening and said assembly frame may be pivoted about said swivel bearings to pivot said mounting unit away from said roof opening.

2. A mounting unit for providing a sliding roof to a motor vehicle roof having an opening fitted therein, comprising:

an assembly frame adapted to be seated on an external peripheral edge of said vehicle roof surrounding said opening and including means for supporting a guide rail at each lateral side of said roof opening;

each guide rail comprises one leg of a one-piece, U-shaped guide rail;

a front and a rear sliding element in each of said guide rails;

a cover for closing said roof opening;

pivot means mounting a leading edge of said cover to a front sliding element in each of said guide rails for pivoting movement of said cover about an axis at a right angle to a direction of travel of said sliding elements;

a pivotally mounted opening lever in each of said guide rails, each opening lever having one end articulated at a point to the frame assembly and being articulated at a second point to said cover for supporting a trailing edge of said cover when said trailing edge of said cover is raised to pivot said cover about said pivot means;

flexible drive cables displaceably guided in guide channels of the U-shaped guide rail, said cables are rigid in compression, engage with a driving pinion and are in driving connection with a rear sliding element in each guide rail;

a drive mechanism of the driving pinion fitted to the rear of the assembly frame;

an operating lever articulated to each of the rear sliding elements, each operating lever is pivotably connected to an opening lever between the two articulation points and closer to the cover-side articulation point of the opening lever;

swivel bearings for connecting one side of said frame assembly to said vehicle roof; and means for locking a side of said frame assembly opposite to said one side to said vehicle roof, whereby said frame assembly, guide rails, cover and opening levers are mountable to the vehicle roof from above as a unit, said cover may be pivoted about said pivot means to selectively open and close said vehicle roof opening and said assembly frame may be pivoted about said swivel bearings to pivot said mounting unit away from said roof opening.

3. A mounting unit for providing a sliding roof to a motor vehicle roof having an opening fitted therein, comprising:

an assembly frame adapted to be seated on an external peripheral edge of said vehicle roof surrounding said opening and providing a guide rail at each lateral side of said roof opening, said assembly frame includes an all-around, upwardly open water channel under a peripheral edge of a cover for closing said roof opening and a U-shaped, upwardly open reception depression provided along two lateral sides and a rear side of said assembly frame, and a partition separating said reception depression from the water channel;

at least one sliding element in each of said guide rails;

pivot means mounting a leading edge of said cover to a sliding element in each of said guide rails for pivoting movement of said cover about an axis at a right angle to a direction of travel of said sliding elements;

a pivotally mounted opening lever in each of said guide rails and connected to said cover for supporting a trailing edge of said cover when said trailing edge of said cover is raised to pivot said cover about said pivot means;

swivel bearings for connecting one side of said frame assembly to said vehicle roof; and means for locking a side of said frame assembly opposite to aid one side to said vehicle roof, whereby said frame assembly, guide rails, cover and opening levers are mountable to the vehicle roof from above as a unit, said cover may be pivoted about said pivot means to selectively open and close said vehicle roof opening and said assembly frame may be pivoted about said swivel bearings to pivot said mounting unit away from said roof opening.

4. A mounting unit according to claim 3, wherein the assembly frame includes a cover strip passing around an outer circumference of said assembly frame and sloping outward from top to bottom and the walls of the water channel, the cover strip and the walls of the reception depression form an assembly frame moulded in one piece.

* * * * *